United States Patent [19]
Sakai et al.

[11] Patent Number: 5,594,844
[45] Date of Patent: Jan. 14, 1997

[54] THREE DIMENSIONAL VIEW USING RAY TRACING THROUGH VOXELS SUBDIVIDED NUMERICALLY USING OBJECT BASED PARAMETERS

[75] Inventors: Toshio Sakai, Katsuta; Norito Watanabe, Hitachi; Masanori Miyoshi, Hitachi; Yoshibumi Fukuda, Hitachi, all of Japan

[73] Assignee: Hitachi, Ltd., Tokyo, Japan

[21] Appl. No.: 186,710

[22] Filed: Jan. 25, 1994

[30] Foreign Application Priority Data

Jan. 26, 1993 [JP] Japan .................................. 5-010465

[51] Int. Cl.$^6$ .................................................. G06T 15/40
[52] U.S. Cl. ........................... 395/127; 395/121; 395/124
[58] Field of Search ...................................... 395/124, 127, 395/121; 382/191, 194, 226

[56] References Cited

U.S. PATENT DOCUMENTS

| | | | |
|---|---|---|---|
| 4,835,712 | 5/1989 | Drebin et al. | 395/124 X |
| 5,113,357 | 5/1992 | Johnson et al. | 395/124 |
| 5,187,660 | 2/1993 | Civanlar et al. | 395/124 X |
| 5,201,035 | 4/1993 | Stytz et al. | 395/124 X |
| 5,226,113 | 7/1993 | Cline et al. | 395/124 |
| 5,233,299 | 8/1993 | Souza et al. | 382/41 |
| 5,284,142 | 2/1994 | Goble et al. | 364/413.13 X |
| 5,317,689 | 5/1994 | Nack et al. | 395/163 |
| 5,329,596 | 7/1994 | Sakou et al. | 382/226 |
| 5,345,490 | 9/1994 | Finnigan et al. | 395/124 X |
| 5,355,442 | 10/1994 | Paglieroni et al. | 395/127 |
| 5,361,385 | 11/1994 | Bakalash | 395/124 |
| 5,381,518 | 1/1995 | Drebin et al. | 395/124 |
| 5,412,763 | 5/1995 | Knoplioch et al. | 395/124 |
| 5,428,716 | 6/1995 | Brokenshire et al. | 395/121 |
| 5,442,733 | 8/1995 | Kaufman et al. | 395/124 |
| 5,452,407 | 9/1995 | Crook | 395/121 |
| 5,452,416 | 9/1995 | Hilton et al. | 395/124 |

OTHER PUBLICATIONS

Subramanian, Applying Space Subdivision Techniques to Volume Rendering, Visualization 1990 Conference, Feb. 1990, pp. 150–159.

Kaufman et al, Volume Graphics, Computer Magazine, Jul. 1993, pp. 51–64.

Glassner, Space Subdivision for Fast Ray Tracing, Computer Graphics and Application, vol. 4 No. 10, Oct. 1984, pp. 15–22.

Fujimoto, ARTS: Accelerated Ray Tracing System, Computer Graphics and Application, vol. 6 No. 4, Apr. 1986, pp. 16–26.

Jevens et al., Adaptive Voxel Subdivision for Ray Tracing, Graphics Interface '89, 1989, pp. 164–172.

Primary Examiner—Heather R. Herndon
Assistant Examiner—Anton W. Fetting
Attorney, Agent, or Firm—Antonelli, Terry, Stout & Kraus

[57] ABSTRACT

A picture generating apparatus using ray tracing has means for inputting data of objects from a data base for storing data of objects composing a virtual three dimensional space, means for registering the data of the virtual three dimensional space divided into a plurality of voxels represented by data in a voxel table, means for determining a voxel subdivision number on the basis of representative parameters expressing geometrical information on said objects composing the three dimensional space, such as the object average size, and means for generating pictures by applying a ray tracing method to the divided voxels and displaying the generated pictures.

9 Claims, 17 Drawing Sheets

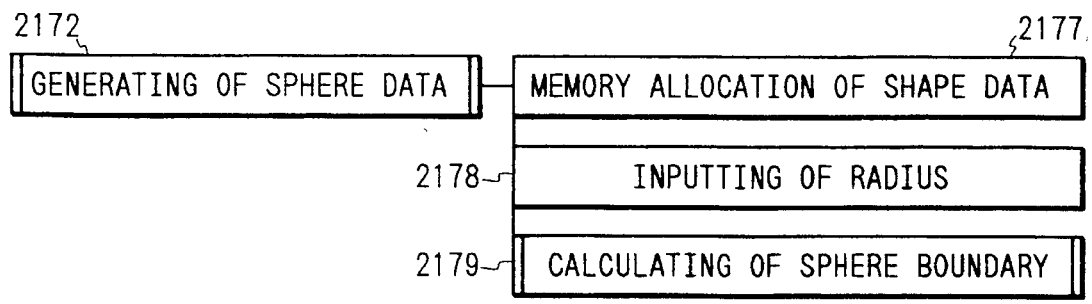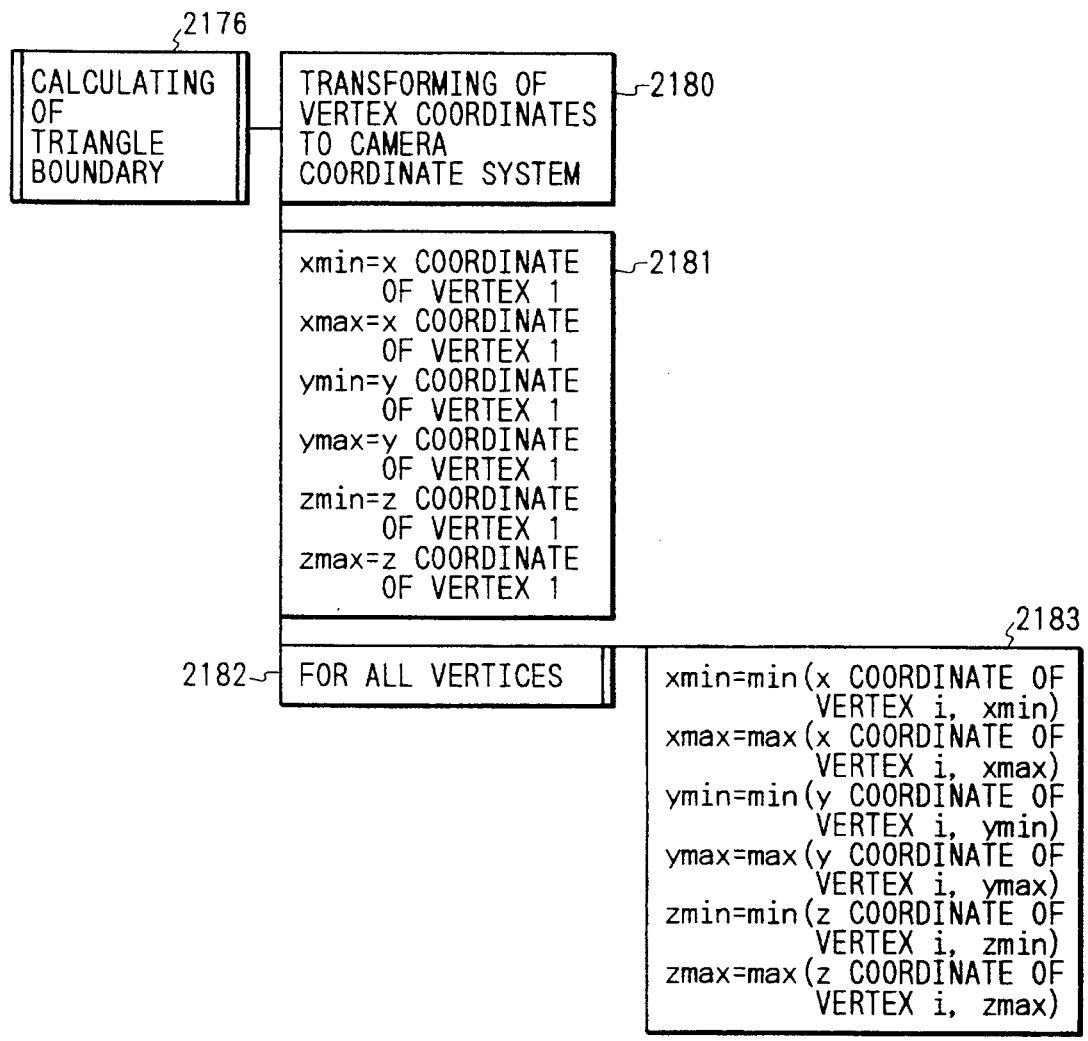

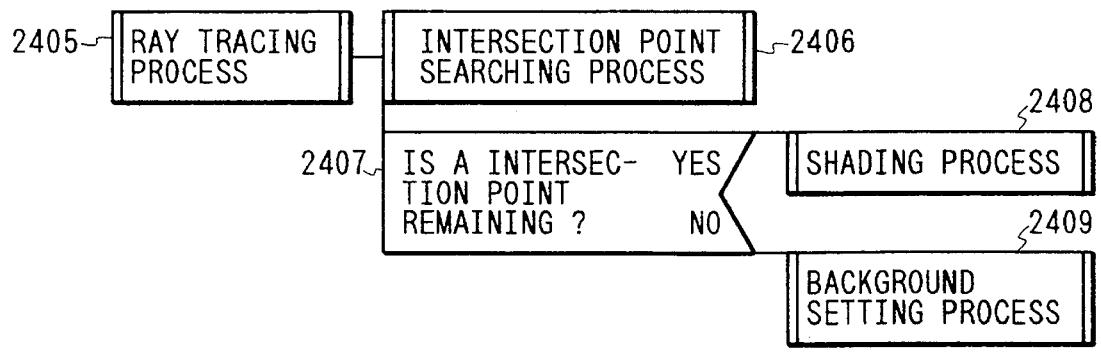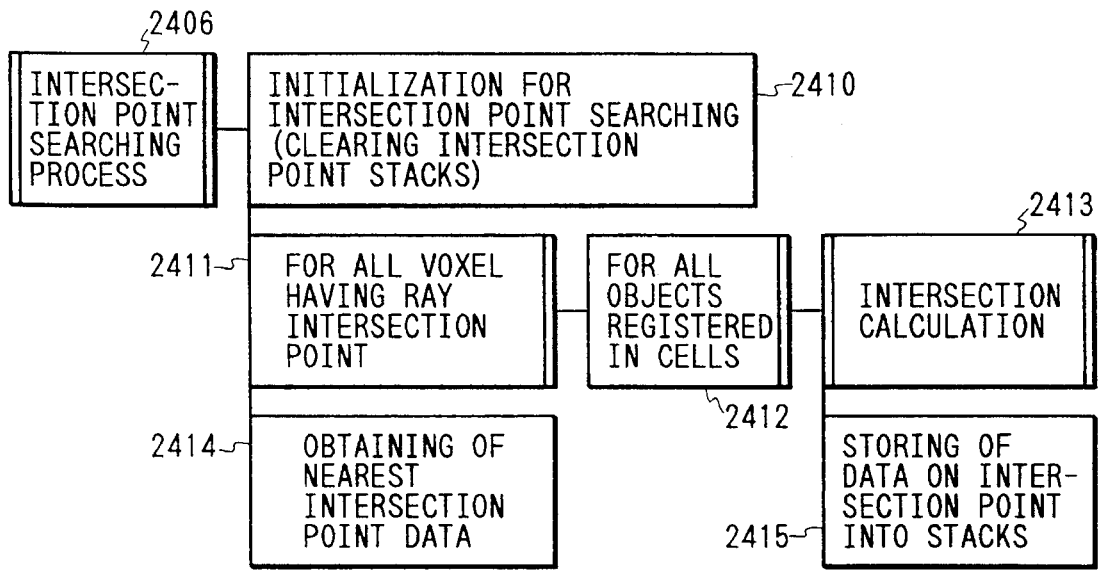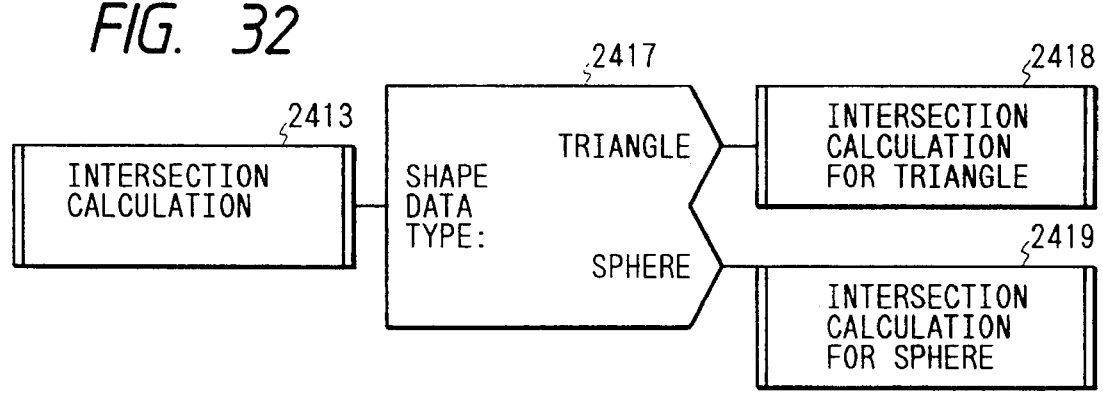

THREE DIMENSIONAL VIEW USING RAY TRACING THROUGH VOXELS SUBDIVIDED NUMERICALLY USING OBJECT BASED PARAMETERS

BACKGROUND OF THE INVENTION

The present invention relates to computer graphic techniques, in particular to an apparatus and a method for fast generating realistic pictures by using a data base storing data of objects in a virtual three-dimensional space.

The ray tracing method directs a ray from a visual point toward each picture element on a screen and sets an object which is hit by the ray as an object to be drawn on the picture element to which the color of the object is allocated. In color processing of the object, this method can render effects of optical attributes, such as the reflection or the refraction of the object on the color of the object drawn on the screen by using the colors of the reflected ray from another object or the refracted ray through another object. Therefore, this method can precisely express reflexes by the reflection or the refraction of other objects surrounding the object. The ray tracing method needs principally a process of searching for an object which is firstly hit (hereinafter the word "hit" is replaced with "intersect") by a shot ray, to every ray. Hereinafter, the process will be referred to as an intersection point searching process. It is well known that the major part of computing time in ray tracing is consumed in the intersection point searching process. The intersection point searching process needs calculation for each of the points intersected by all objects, and the total computing time of the intersection point searching process for making a picture is obtained by the following equation.

$$\text{(Computing time of intersection point searching process)} = \quad (1)$$

$$\text{(Ray number)} \times \text{(Object number[articles/ray])} \times$$

$$\text{(Computing time of calculation on intersection points[sec./article])},$$

where (Ray number) is the number of rays needed to make a screen picture, (Object number) is the calculation number of intersection points of the objects and one ray and (Computing time of intersection points) is the computing time of an intersection point of a ray and an object.

The speeding up of the picture generating process, including the intersection point searching process, is an important subject. For example, the computer generated perspective pictures of the three dimensional arrangement of pipes and other components from various visual points are used in the piping design of buildings in a nuclear power plant. Since about a hundred thousand pipes and components exist in a building, it conventionally takes more than thirty minutes to generate a perspective picture. So it has been strongly desired to speed up the generation of such three dimensional pictures as mentioned above. The speed-up technique of the computing time of the intersection point searching process involves a method of reducing each term in the right hand side of Eq.(1). Especially, a method of reducing the term (Object number) is most effective and is known as what is called a fast processing method by space division (hereinafter referred to as the space subdivision method). Briefly the space subdivision method judges in advance whether the ray intersects an object and executes a precise calculation on the intersected object only in the case the ray intersects the object.

The octree subdivision method presented in the paper "Space Subdivision for Fast Ray Tracing" by Glassner, Andrew S., IEEE Computer Graphics and Applications, Vol. 4, No. 10, October 1984, pp. 15–22, is known as one of the space subdivision methods. The octree subdivision method divides the space including objects into 8 sub-spaces. In this method, the subdivision is continued until the number of the object included by a sub-space comes up to only one. The cells obtained in the above-mentioned way have a hierarchy structure by the unit of 8 leaves, which is generally called an octree.

And, as another space subdivision method, there is known the voxel subdivision method presented in the paper "ARTS: Accelerated Ray-Tracing System", by Akira Fujimoto, Takayuki Tanaka and Kansei Iwata, IEEE Computer Graphics and Applications, Vol. 6, No. 4, April 1986, pp. 16–26. Also in Japan Patent Laid Open 139890/1986, the voxel subdivision method is presented. The voxel subdivision method divides the space including all objects into equal parts. The processing speed of the voxel subdivision method is faster than that of the octree subdivision method since the space is equally divided. That is, the next cell calculation can be done by 3DDDA (3 Dimensional Digital Differential Analysis: calculation by one increment of an integer and one floating point addition in one calculation step). In the voxel subdivision method, the number of the cells to be searched is less than that of the octree method, even if the ray does not intersect an object.

Further, another subdivision method known as the hierarchy type voxel subdivision method is presented in the paper "Adaptive Voxel Subdivision for Ray Tracing", by David Jevans et al., Graphics Interface' 89, pp.164–172. The hierarchy type voxel subdivision variation is a variation of the generalized octree subdivision method. The method, at first, divides the space including all objects into equal parts and forms voxels. Next, the method again divides the cells more minutely if there exist cells in which the number of objects registered exceeds a predetermined number. The cell searching for the cells formed in the above-mentioned manner is carried out by the same algorithm as in the voxel subdivision method. The hierarchy type voxel subdivision method can process the cell searching faster than the above-mentioned other two methods since the method combines the advantageous points of the two methods.

The processing speed of the above-mentioned space subdivision methods strongly depends on the space distribution of the objects composing the 3D virtual space.

The octree subdivision method has the problem that its computing time is longer than that of the voxel subdivision method in the case the space distribution of the objects is uniform, since all octrees formed by the octree subdivision method need to be traversed by the ray. In one time of traverse, the traverse processing up and down on the tree structure is executed. Further, the octree subdivision method also needs more computing time than the voxel subdivision method when a scene (3 dimensional scene) is traversed by the ray, since many octree should be traversed in such a case. Especially, the trend becomes more remarkable when the ray penetrates a scene without an intersection point, since the ray traverse should be carried out for all octrees.

On the other hand, the voxel subdivision method has the problem that its processing speed is lower than that of the octree subdivision method when the space distribution of objects is localized. The localization of the space distribution means that more objects exist in local parts. In the process of searching intersection points in the cells, the intersection calculations with all objects registered in the cell is needed. When many objects are localized to one cell, the intersection calculation needs much time, since the computing time consumed by the intersection calculation is longer than that of the cell searching. Increasing the division number to avoid the problem of the localization causes a decrease in the processing speed, since much computing time is consumed by the cell searching. The above-mentioned conventional voxel subdivision method in which the division number should be input by a user in advance has the problem that it is necessary to input the division number by a user's experience, corresponding to the space distribution of objects. The problem of the hierarchy type voxel method is that its processing performance depends on such factors as the initial division number, the predetermined threshold of the object number to further subdivision, the subdivision number after the first layer and the depth of the layer structure.

SUMMARY OF THE INVENTION (1) Object of the Invention

An object of the present invention is to solve the above-mentioned problems and to provide an apparatus and a method for high speed generation of pictures using ray tracing wherein the intersection calculation can be executed at high speed, not being much affected by the space distribution of objects composing the virtual 3D space.

(2) Means for Solving the Problems

The present invention provides a picture generating apparatus using the voxel subdivision method for dividing a three dimensional scene space, comprising division number deciding means for automatically deciding the division number in the voxel subdivision method from representative parameters expressing geometrical characteristic information of all objects forming three dimensional scene data stored in a data base. In preferred application examples of the invention, a parameter expressed by a function of the average size of the objects, particularly the average size itself, is adopted as the representative parameter expressing geometrical characteristic information of all objects for deciding the voxel subdivision number. The division number deciding means of the present invention acts uniformly to register the objects onto the cells by using the above-mentioned parameter relating to the geometrical characteristics of all objects included in the data base. Especially, the space subdivision by the division number decision means of the present invention gets near the state that one object is registered to one cell, since the voxel subdivision number is decided by the average size of the objects. Therefore, the computing time of the intersection point searching process does not depend on the distribution of object shapes. And, the division number can be automatically obtained independently of a user's experience by using the representative parameters expressing geometrical characteristics of objects forming three dimensional scene data stored in the data base.

As other representative parameters expressing geometrical characteristic information of objects, the below-mentioned average object sizes for each coordinate of x, y and z are also used. Those three kinds of average object sizes are calculated from the rectangular parallelepiped boundary enclosing all objects, that is, the three sizes of the average widths of a voxel in the x, y and z directions.

The representative parameters expressing geometrical characteristic information of objects are not exclusive to the above-mentioned parameters. Such a parameter as the one obtained from the average value of object sizes incorporated into the object space distribution, an average value of the predetermined division number of each object and so on can be also effectively used as the representative parameters expressing geometrical characteristic information of objects.

BRIEF DESCRIPTION OF THE DRAWINGS

FIG. 8 is a flow chart of a generating process of sphere data 2172.

FIG. 9 is a flow chart of a process for calculating a triangle boundary 2176.

FIG. 30 is a flow chart of a ray tracing process 2405.

FIG. 31 is a flow chart of an intersection point searching process 2406.

FIG. 32 is a flow chart of an intersection calculation process 2407.

DETAILED DESCRIPTION OF THE EMBODIMENTS

Hereinafter, details of various embodiments of the present invention will be explained with reference to the drawings.

Figure 1:
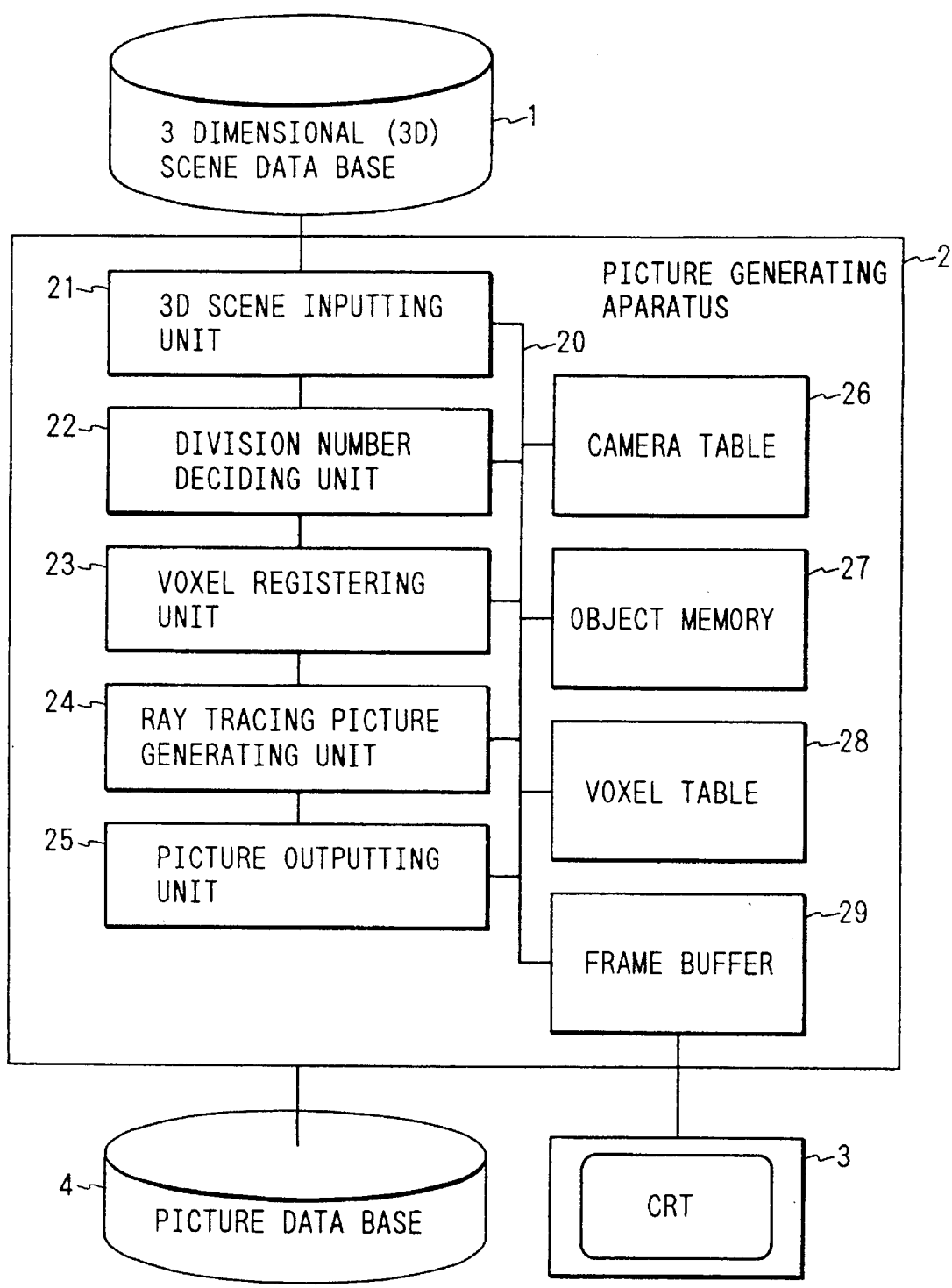
FIG. 1 is a schematic block diagram of the picture generating apparatus using ray tracing in accordance with the present invention.
Figure 2:
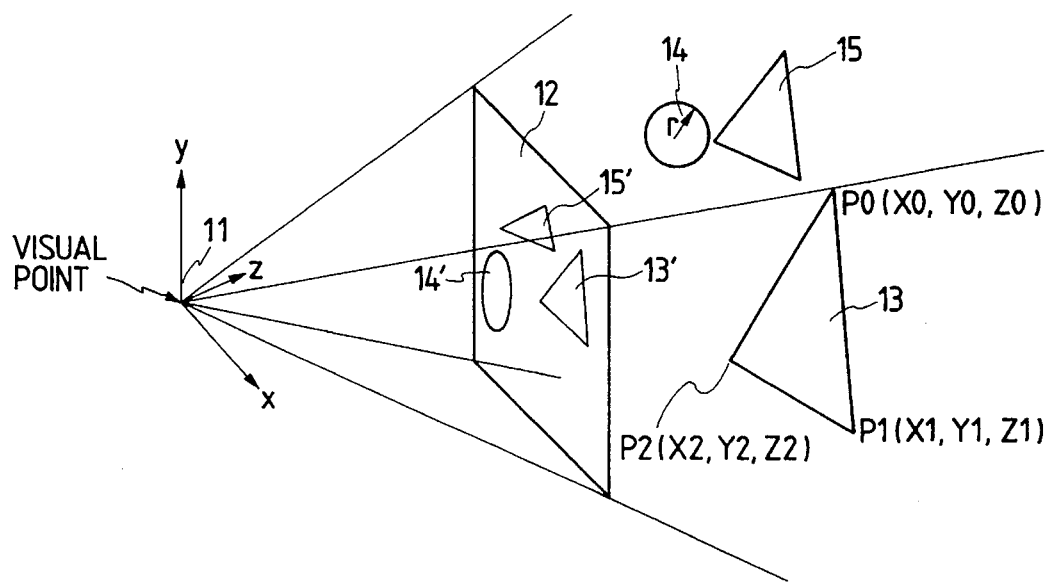
FIG. 2 shows an example of shape data of objects stored in a three dimensional (3D) scene data base 1.

In FIG. 1, an embodiment of a picture generating apparatus operating in accordance with a method using ray tracing is shown. As shown in the figure, the picture generating apparatus using ray tracing 2 reads shape data and optical attribute data of objects stored in a virtual three dimensional (referred to 3D) scene data base 1 by a 3D scene inputting unit 21 and stores the data in a camera table 26 and an object memory 27. A division number deciding unit 22 decides the number of voxels using the shape data of the objects stored in the object memory 27. A voxel registering unit 23 divides the 3D space on the basis of the division number decided by the division number deciding unit 22, makes a voxel table 28 and stores the object data registered in the object memory 27 in the voxel table 28. A ray tracing picture generating unit 24 calculates a color for each picture element of a screen by the ray tracing method using the established voxel table 28 and writes the colors in a frame buffer 29. A data bus 20, connected to each unit, the tables and the memories, delivers the data among them. The frame buffer 29 connected to a CRT 3 sends the picture data to the CRT. A picture outputting unit 25 outputs the contents of the frame buffer 29 to a picture data base 4 which is an external memory. FIG. 2 is a conceptual view indicating the positional relations among a visual point, a screen and the objects in the virtual 3D space. The numeral 11 shows the origin of the coordinate system. The visual point of a virtual camera is set at the origin 11 and faces the z direction. The numeral 12 shows the virtual camera screen. The numerals 13, 14 and 15 refer to examples of object shapes. The numerals 13 and 15 refer to examples of triangular shaped objects. The numeral 14 refers to an example of a spherical shaped object. The numerals 13', 14' and 15' refer to the pictures of the objects 13, 14 and 15 projected on the virtual screen 12. The object shape data stored in the 3D scene data base 1 is the coordinate data of vertices, such as P0 (X0, Y0, Z0) and P1 (X1, Y1, Z1,) for the triangles 13 and 15 and the radius r for the sphere 14. Though only triangles and a sphere are treated in the embodiment, such Parametric Surfaces spread by a set of vertices as a triangle, or such a quadratic surface such as a sphere etc. (other examples are a hyperboloid, a torus, a cone, a column and a paraboloid and so on) can be also treated by the present invention.

Figure 3:
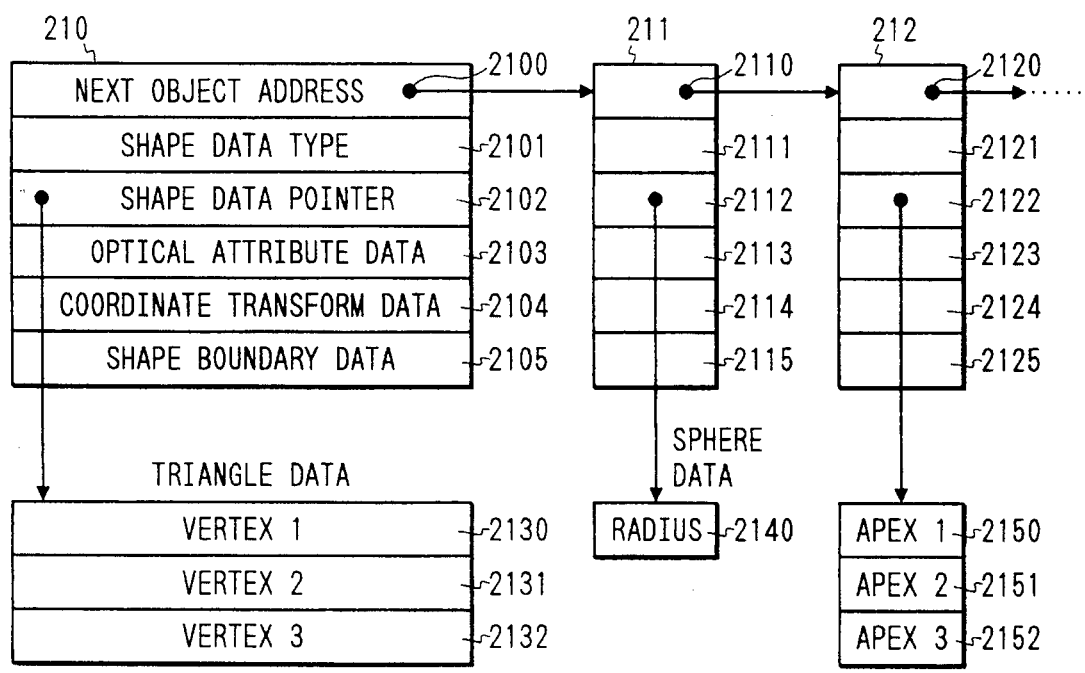
FIG. 3 shows an example of the contents of an object memory 27 inputted from the 3D scene data base, by a 3D scene inputting unit 21.

FIG. 3 shows an example of the contents of the object memory 27 written by the 3D scene inputting unit 21. The object tables 210, 211 and 212 are the tables on which all data relating to the objects are written. Each element composing the table will be explained by referring to an example of the table 210. The region 2100 is a region storing the first address of the next object data. The shape data type region 2101 is a region storing a shape tag for specifying the shape of an object, such as a triangle or a sphere. The shape data pointer region 2103 is a region storing the address of the object memory 27 where real data of the shape is stored, and the real data are represented by the coordinates 2130, 2131 and 2132 of the three vertices of the triangle 13 shown in FIG. 2. Further, the region 2140 is a region storing the radius data of the sphere 14 shown in FIG. 2. The optical attribute data region 2103 is a region storing the optical attribute data of the object such as color, a reflection coefficient, a refraction coefficient, a transmission ratio, a pattern of the object and so on. The coordinate transform data region 2104 is a region storing coordinate transform matrix data for arranging the object 210 in the coordinate system having the origin 11 in which all objects are positioned. The region 2105 is a region storing boundary data of the region where the object exists in the coordinate system having the origin 11. The object shape boundary is obtained from the minimum value of the x coordinate (xmin), the maximum value of the x coordinate (xmax), the minimum value of the y coordinate (ymin), the maximum value of the y coordinate (ymax), the minimum value of the z coordinate (zmin) and the maximum value of the z coordinate (zmax).

Figure 4:
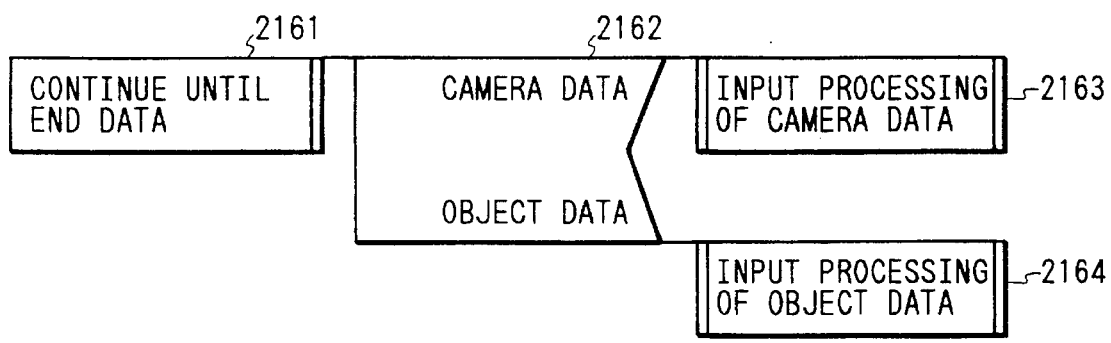
FIG. 4 is a main flow chart of the process executed in the 3D scene inputting unit 21.
Figure 5:
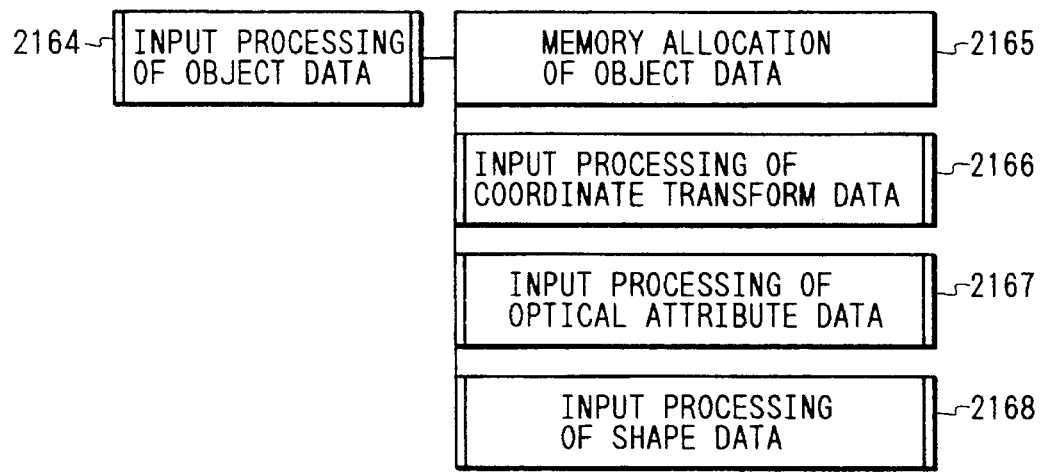
FIG. 5 is a flow chart of input processing of object data 2164.
Figure 6:
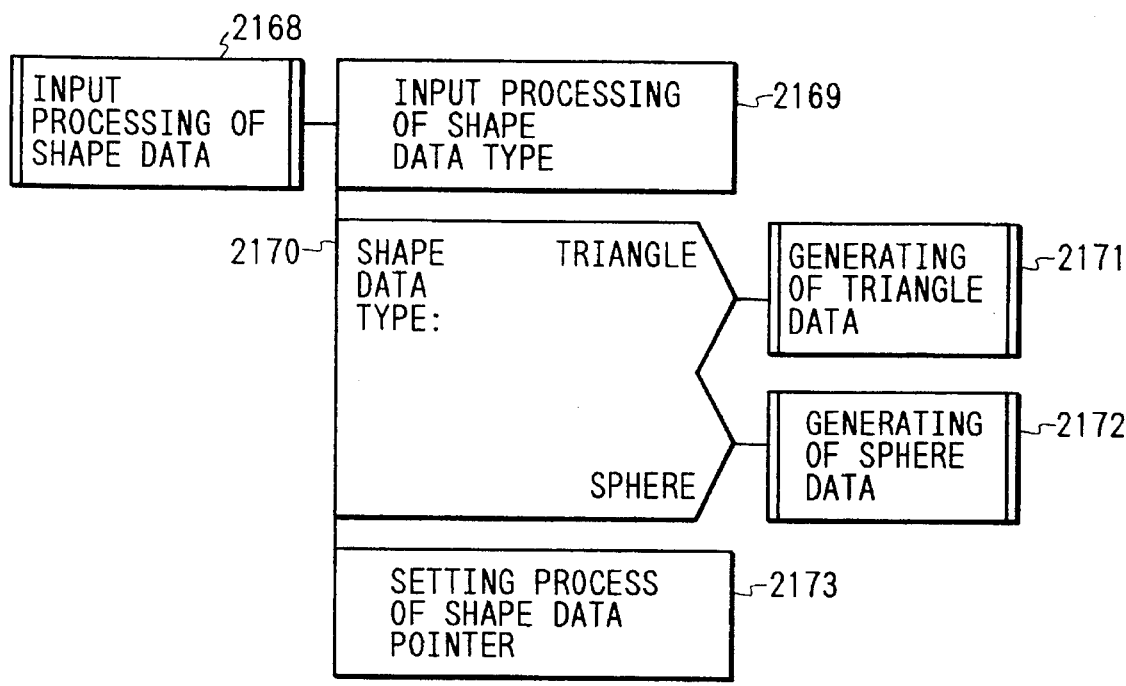
FIG. 6 is a flow chart of input processing of shape data 2168.
Figure 7:
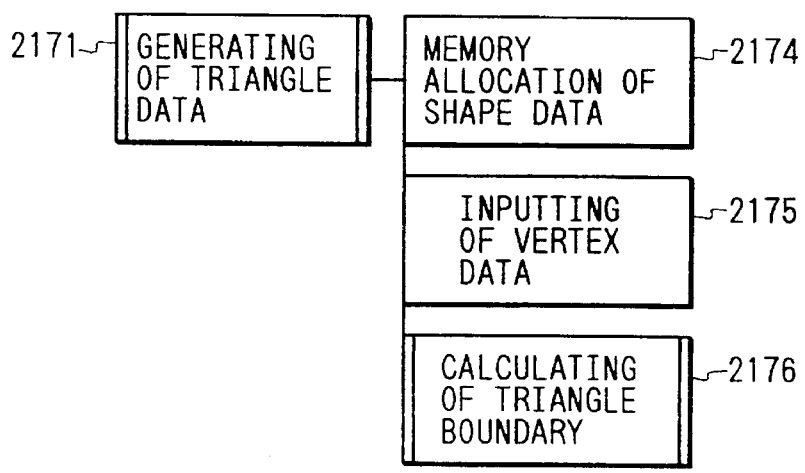
FIG. 7 is a flow chart of a generating process of triangle data 2171.
Figure 10:
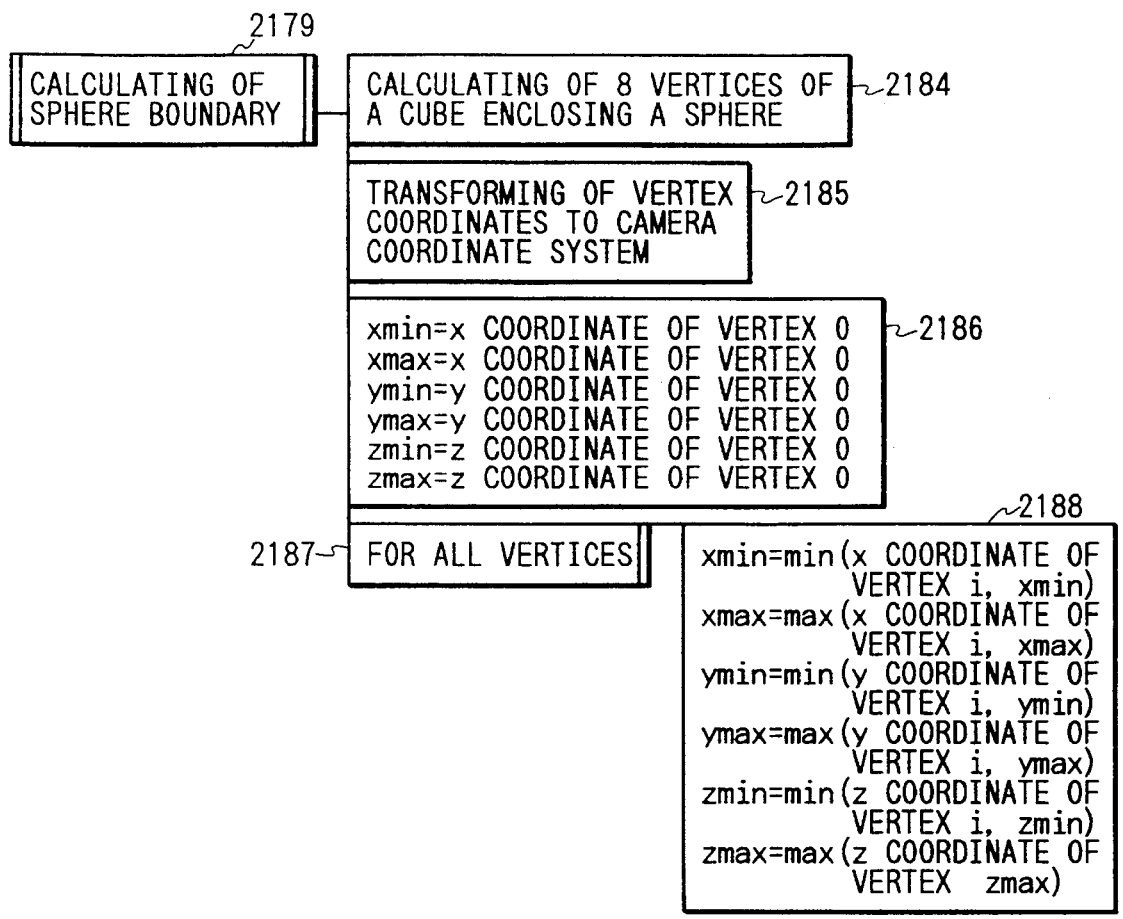
FIG. 10 is a flow chart of a process for calculating a sphere boundary 2179.

FIGS. 4–10 indicate process flows executed in the 3D scene inputting unit 21 for establishing the object memory shown in FIG. 3. FIG. 4 indicates the main flow of a process executed in the 3D scene inputting unit 21. The process 2161 reads the tags for determining either the camera data or the object data from the 3D scene data base 1. The process 2161 is continued until all data in the 3D scene data base 1 has been read out. And, the process 2161 allocates the read data to the camera data inputting process 2163 or the object data inputting process 2164 corresponding to the read tag contents. The camera data inputting process 2163 takes in the data for determining the specification of the camera and stores the data in the camera table 26. The specification data of the camera includes resolution, sampling number of a picture element, angular field of view and so on. The resolution is the data for setting division numbers of picture elements in the horizontal and vertical directions. The sampling number of a picture element is the data for setting a sampling number to each picture element divided on the screen. The larger the number is, the more smooth the picture becomes. The angular field of view is the data for setting the size of the screen. FIG. 5 shows the input processing of object data described in the explanation of FIG. 4. The input processing 2164 of object data at first executes a memory allocation of object data 2165 securing the region for the object table 210 in the object memory 27 shown in FIG. 3. Input processing 2166 of coordinate transform data inputs an arrangement matrix of an object in the coordinate system having the origin 11 and stores it in the region of coordinate transform data 2104 in the object table 210. Input processing of optical attribute data 2167 inputs optical attribute data of an object and stores it in the region of optical attribute data 2103. Input processing 2168 of shape data takes in the shape data of an object, allocates the region for storing the shape data in the object memory 27 and stores the shape data in the allocated region. The input processing 2168 of shape data further stores the address of the allocated region in the shape data pointer 2102. FIG. 6 shows a flow of the input processing 2164 of object data described in the explanation of FIG. 5. Input processing 2169 of a shape data type inputs a shape data type from the 3D scene data base 1. Numerals or character series are used as the shape data type. Shape identifying process 2170 branches the process 2171 to a process for generation of triangle data or a process 2172 for generation of sphere data corresponding to the type inputted by the input processing 2169 of a shape data type. Setting process 2173 of a shape data pointer stores the address of the data region established by the generating process 2171 of triangle data or the generating process 2172 of sphere data into the object table 210, 211 or 212 on the object memory 27. FIG. 7 shows a flow of the generating process 2171 of triangle data described in the explanation of FIG. 6. A process 2174 for memory allocation of shape data allocates the regions 2130, 2131 and 2132 for storing the coordinates of three vertices of a triangle on the object memory 27. A process 2175 for inputting of vertex data inputs the data of the three vertices of the triangle and stores the inputted data in the region allocated by the process for the memory allocation of shape data 2174. A process 2176 for calculation of a triangle boundary calculates a boundary of the object shape in the coordinate system having the origin 11 by using the inputted data of the three vertices and stores it in the region for memorizing the shape boundary. For example, the process 2176 for calculating a triangle boundary stores the calculated shape boundary data in the memories for the shape boundary region 2105 of the object table 210 shown in FIG. 3. FIG. 8 shows a flow of the generating process 2172 of sphere data. A process 2177 for memory allocation of shape data allocates the region for storing a radius of a sphere in the object memory 27. A process 2178 for inputting of a radius inputs the radius data from the 3D scene data base 1 and stores the radius data in the region (for example, the region 2140 in FIG. 3) allocated by the process for memory allocation of shape data 2177. A process 2179 for calculating a sphere boundary calculates the sphere boundary in the coordinate system having the origin 11 and stores the sphere boundary data in the memories for the shape boundary region of the object table. For example, the process 2179 for calculating a sphere boundary stores the calculated shape boundary data in the memories for the shape boundary region 2115 of the object table 211 shown in FIG. 3. FIG. 9 shows a flow of a process 2176 for calculating a triangle boundary. A process 2180 executes a transforming of the coordinate data of triangle vertices into those of the coordinate system having the origin 11 where the camera is set by using the coordinate transform data of the object table. For example, the process 2180 transforms the data of triangle vertices 2130, 2131 and 2132 into the coordinate data in the coordinate system of the origin 11 by using the coordinate transform data 2104 of the object table 210. An initialization process 2181 initializes the coordinates of the shape boundary of the object table by using the coordinate of the vertex 1 transformed by the process 2180. More specifically, the process 2181 sets each of the x, y and z coordinate values 2130 of the triangle vertex 1 as the initial values of the minimum value of the x coordinate (xmin), the maximum value of the x coordinate (xmax), the minimum value of the y coordinate (ymin) and the maximum value of the y coordinate (ymax). A process 2182 repeats a process 2183 for all remaining vertices. The process 2183 executes an enlarging of the shape boundary of the triangle based on the coordinates of the vertices transformed in the coordinate system having the origin 11. For example, the minimum value among the x coordinate stored in the shape boundary memory 2105, the x coordinate of the vertex 2 and the x coordinate of the vertex 3 is set as the new minimum value in the shape boundary memory 2105 (xmin). In the same way for (xmin), the maximum value among the x coordinate stored in the shape boundary memory 2105, the x coordinate of the vertex 2 and the x coordinate of the vertex 3 is set as the new maximum value in the shape boundary memory 2105 (xmax). The index i in the figure corresponds to the vertex number. The same processes as mentioned above are performed on the y and z coordinates. FIG. 10 shows a flow of the process 2179 for calculating of a sphere boundary. A process 2184 calculates the coordinates of the eight vertices of a cube enclosing the sphere in the coordinate system where the coordinates of the sphere are defined. More specifically, the process 2184 calculates the coordinates of the eight vertices of the cube described below by defining the radius of the sphere as r.

$$\begin{array}{ll}
\text{Vertex } 0 = (-r, -r, -r), & \text{Vertex } 1 = (\ r, -r, -r), \\
\text{Vertex } 2 = (\ r, \ r, -r), & \text{Vertex } 3 = (-r, \ r, -r), \\
\text{Vertex } 4 = (-r, -r, \ r), & \text{Vertex } 5 = (\ r, -r, \ r), \\
\text{Vertex } 6 = (\ r, \ r, \ r), & \text{Vertex } 7 = (-r, \ r, \ r).
\end{array} \quad (2)$$

A process 2185 executes a transforming of the coordinates of the eight vertices obtained by the process 2184 to the coordinates in the coordinate system having the origin 11 by using the coordinate transform data of the object table. A process 2186 initializes the coordinate data of the shape boundary in the object table by using the coordinates of the vertex 0 transformed by the process 2185. A process 2187 repeats process 2188 for all remaining vertices. The process 2188, as well as the process 2183, executes an enlarging of the shape boundary of the sphere based on the coordinates of the vertices transformed in the coordinate system having the origin 11.

The object memory 27 can be established as shown in FIG. 3 by executing the above-mentioned processes.

Figure 11:
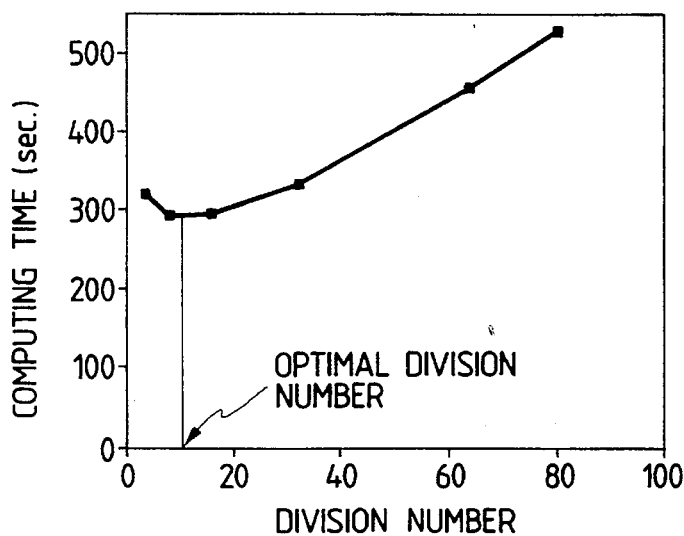
FIG. 11 shows the measured computing times for generating a picture for the first one of four different 3D scenes by the ray tracing picture generating unit 24 in changing the division number of the voxel subdivision.
Figure 12:
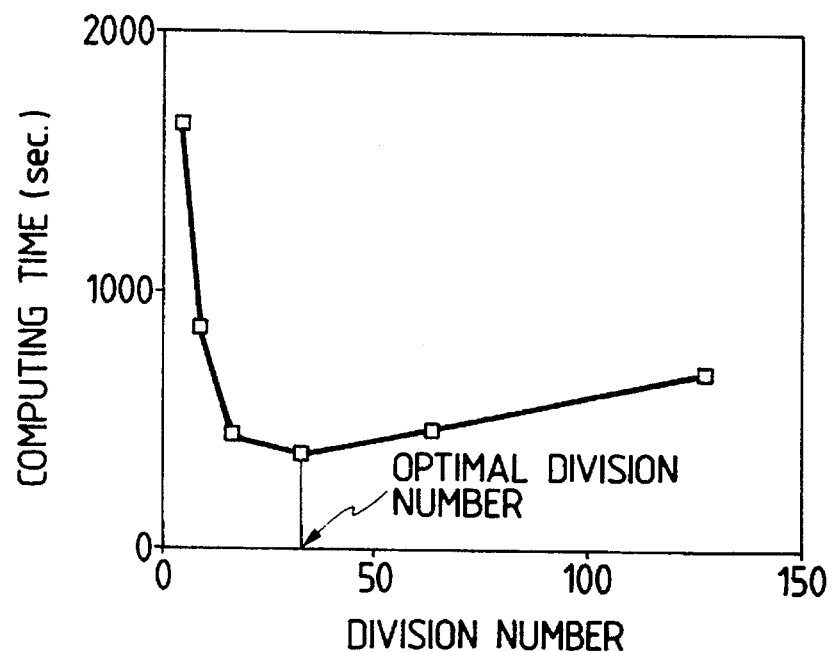
FIG. 12 shows the measured computing times for generating a picture for the second one of four 3D scenes by the ray tracing picture generating unit 24 in changing the division number of the voxel subdivision.
Figure 13:
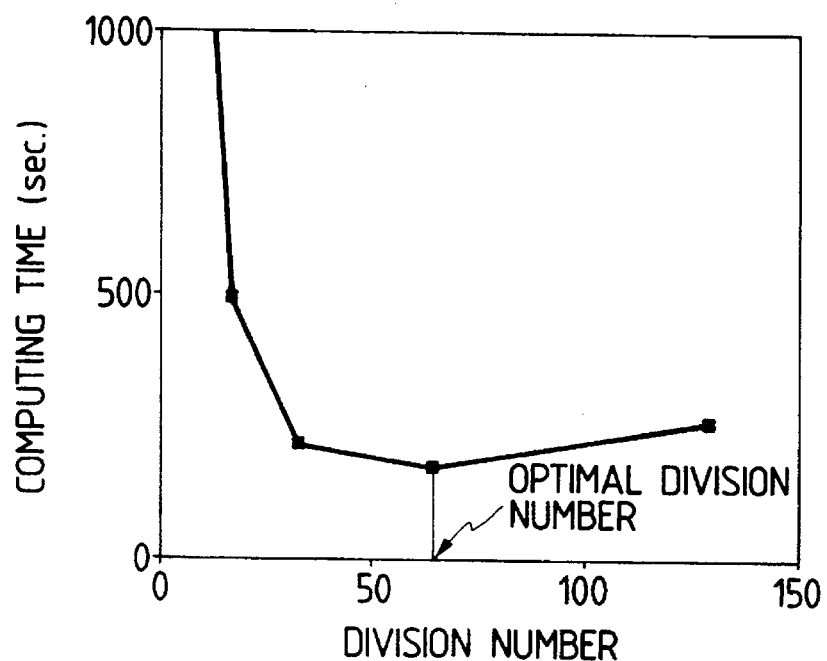
FIG. 13 shows the measured computing times for generating a picture for the third one of four 3D scenes by the ray tracing picture generating unit 24 in changing the division number of the voxel subdivision.
Figure 14:
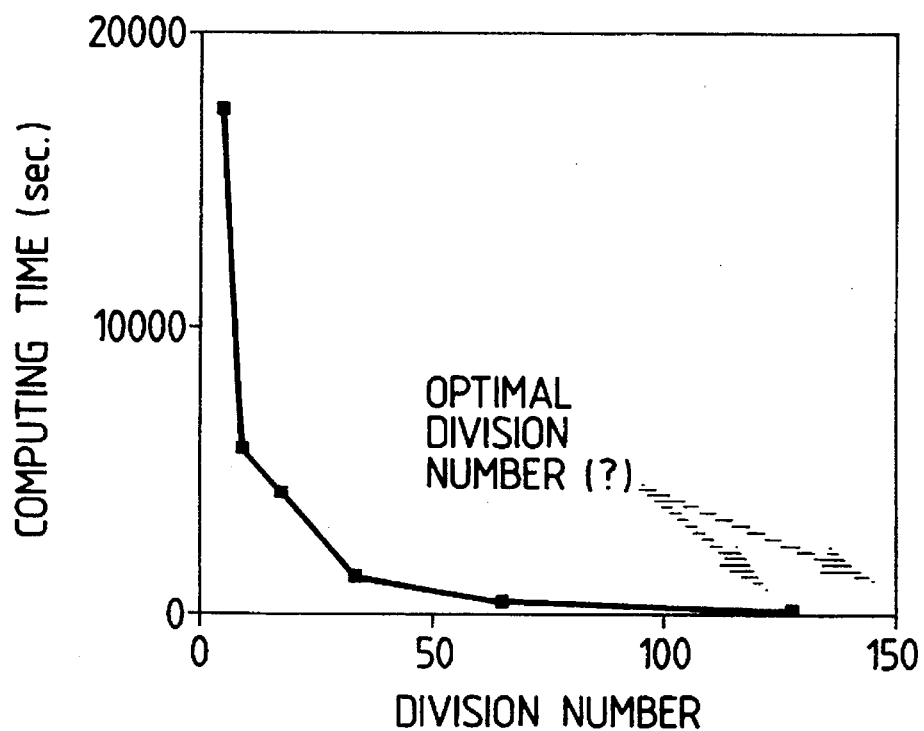
FIG. 14 shows the measured computing times for generating a picture for the fourth one of four 3D scenes by the ray tracing picture generating unit 24 in changing the division number of the voxel subdivision.
Figure 15A:
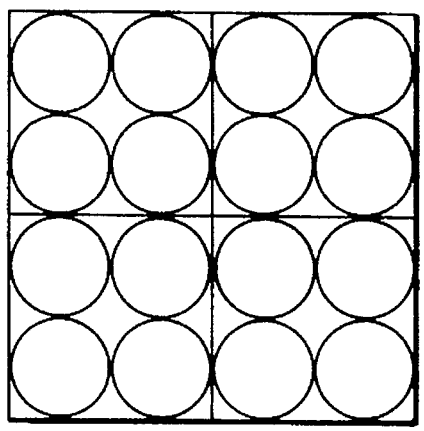
FIG. 15(a) and (b) are conceptual drawings for explaining the trend of the computing time change shown in FIGS. 11–14.
Figure 15B:
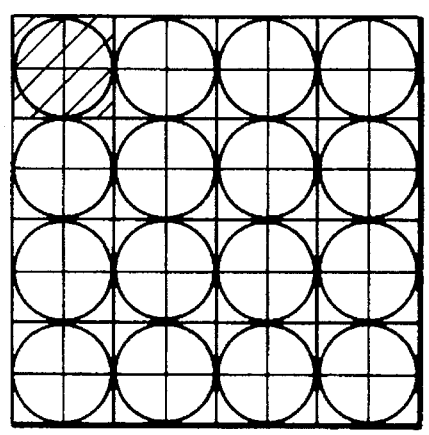

The fundamental operation of the division number deciding unit now will described. FIGS. 11–14 show the measured results of computing time by the present picture generating apparatus using ray tracing in changing the voxel subdivision number to four different scenes. From the figures, it can be seen that the optimal division number depends on the object data in the 3D scene data base 1. FIG. 11 shows the results in the case that each object has a relatively large size for the space enclosing the objects therein. On the other hand, FIG. 14 shows the results in the case where each object has a relatively small size for the space enclosing the objects therein. In both cases, there exists an the optimal division number for each scene. The optimal division number in the case shown by FIG. 11 is comparatively small and that for the case shown by FIG. 14 is more than the former. By the results shown in FIGS. 11–14, it is seen that the optimal division number of the voxel subdivision is affected by geometrical parameters of the objects enclosed in the data base. In FIGS. 15(*a*) and (*b*), the trend of the optimal division numbers is conceptually explained. As shown in FIG. 15(*a*), the larger number of the objects to be registered in a cell is, the smaller will be the number of the voxel subdivision. Consequently, since the calculation process for intersection points is executed for all objects registered in a cell, the amount of the intersection calculation increases, which causes an increase in the computing time of the picture generating apparatus using ray tracing. On the contrary, as shown in FIG. 15(b), if the division number becomes too larger, an object may be registered in plural cells. For example, an object is registered over a plurality of cells indicated by oblique lines in FIG. 15(b). Since the calculations of intersection points in the intersection point searching process is carried out for every cell, the case shown in FIG. 15(b) needs many intersection calculations, which causes an increase in the computing time of the picture generating apparatus using ray tracing. Then, speeding up the computing time of the picture generating apparatus using ray tracing is possible by determining the optimal division number of the voxel subdivision on the basis of a parameter representing geometrical characteristics (hereinafter referred to a geometrical parameter), such as object sizes, object space distribution etc. A geometrical parameter based on object sizes is used in the embodiment, but other geometrical parameters, such as a parameter also taking consideration of the object space distribution into account are applicable to the voxel subdivision process of the present invention.

Figure 16:
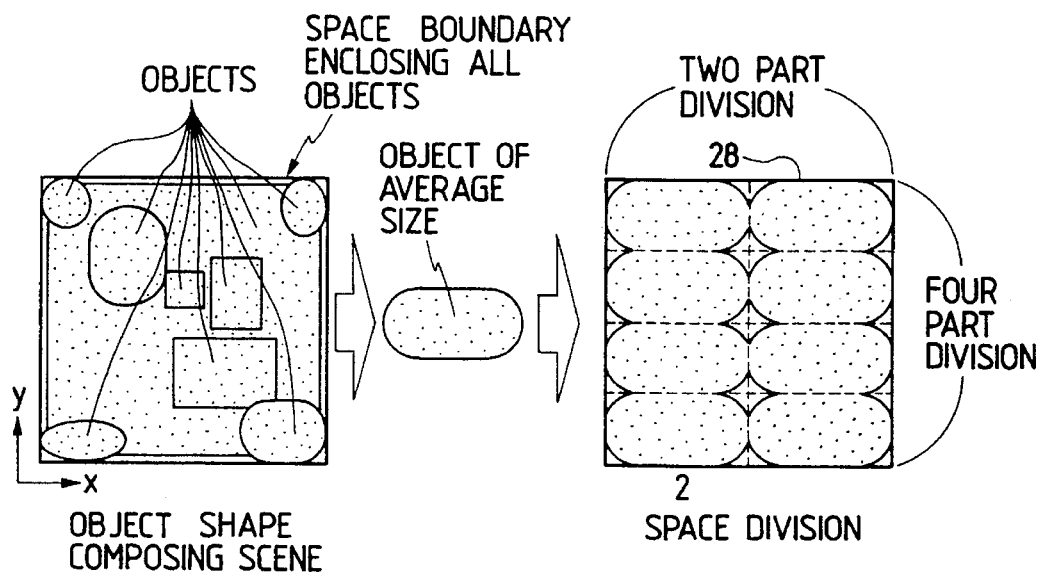
FIG. 16 is a conceptual drawing for explaining the process carried out in the division number deciding unit 22.
Figure 17:
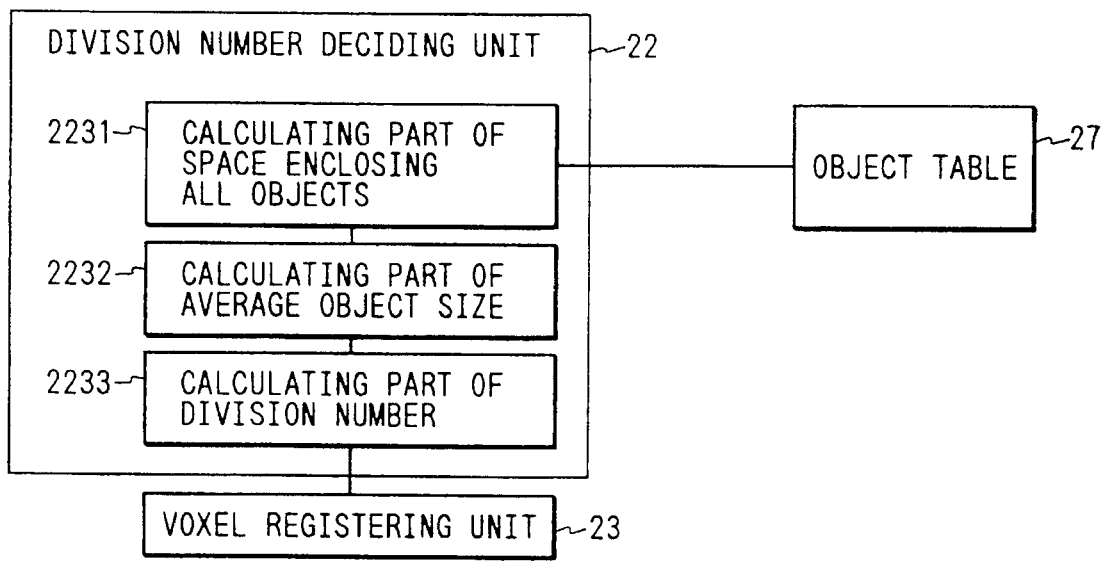
FIG. 17 is a block diagram of the division number deciding unit 22 deciding the voxel subdivision number based on object sizes.

A voxel subdivision number deciding method using a geometrical parameter based on the object sizes now will be described. The division number deciding method divides the space by the average size of the objects composing the 3D scene, assuming that objects having an average size are uniformly distributed in the space as shown in FIG. 16. In order to simplify the explanation, the figure is drawn as a 2D picture. The division can be done also independently in the x direction and in the y direction. In the example shown in the figure, the x direction is divided into two parts and the y direction into four parts. The division by the present method can be easily performed since the division number is determined by using only the boundaries of the objects. And, it can be expected that an object having the average size is enclosed in one voxel. FIG. 17 shows the constitution of the division number deciding unit 22 by using the geometrical parameter based on the object sizes. A calculating part 2231 obtains the boundary of the space enclosing all objects. A calculating part 2232 obtains the object average size from the shape boundary of each object. A calculating part 2233 obtains the voxel subdivision number for each coordinate axis from the results calculated by the calculating part of the space enclosing all objects 2231 and the calculating part of the average object size 2232. The total voxel subdivision number is obtained from the following equation.

(Total voxel subdivision number) = (3)

Figure 18:
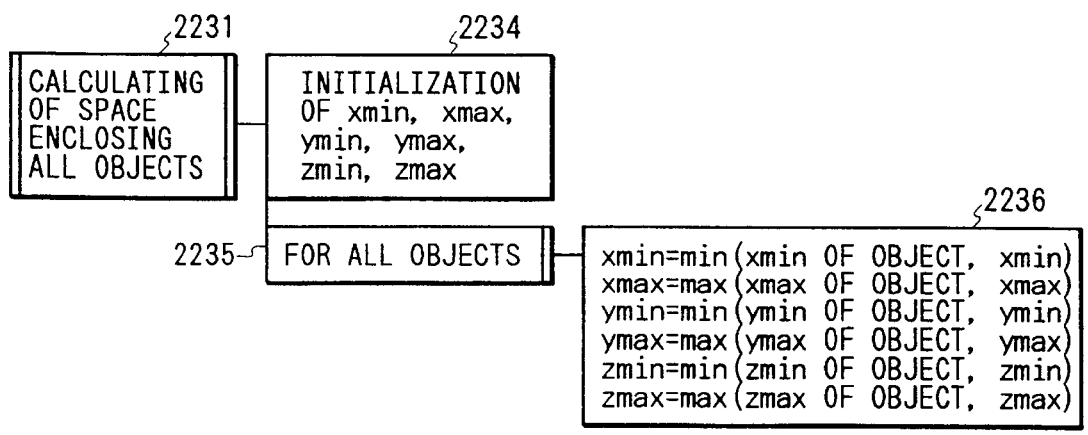
FIG. 18 is a flow chart of a process for calculating the space enclosing all objects 2231.
Figure 19:
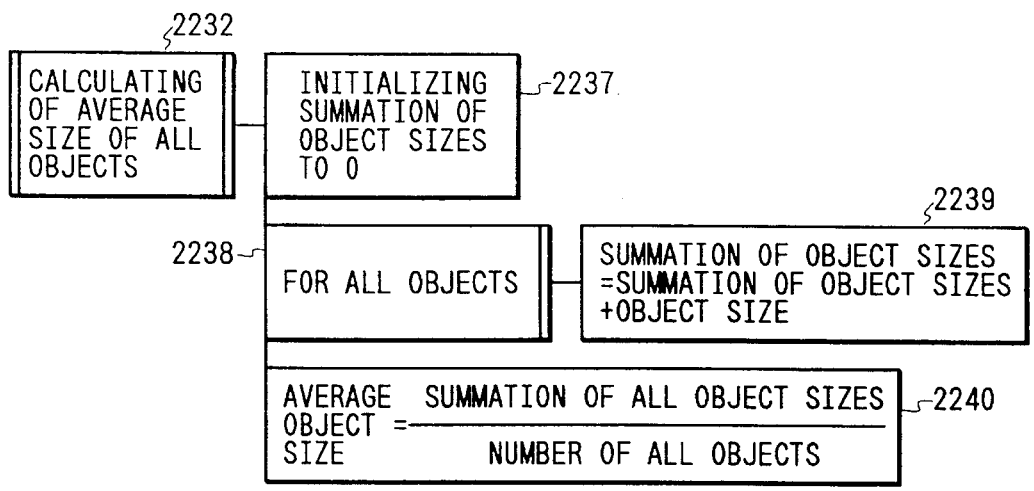
FIG. 19 is a flow chart of a process for calculating the average size of all objects 2232.
Figure 20:
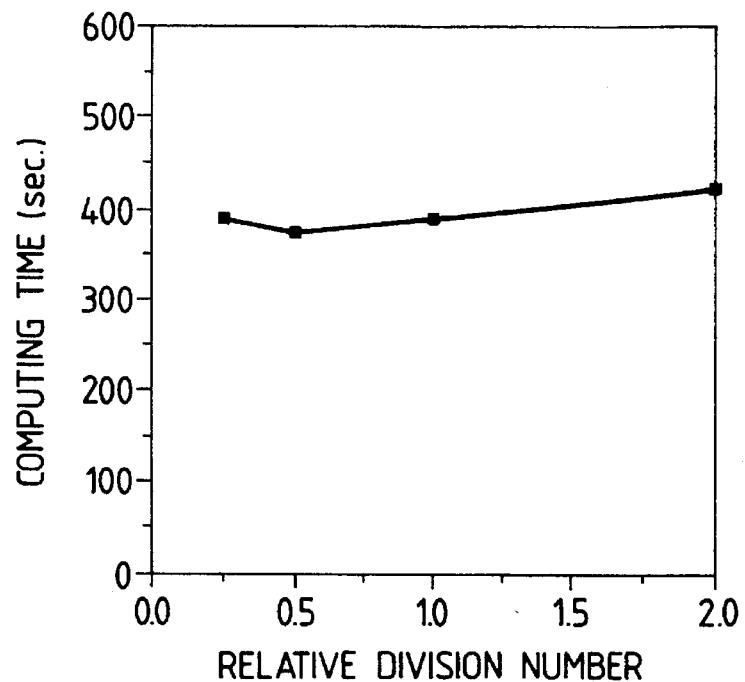
FIG. 20 shows the measured computing times for generating a picture for the first one of four different 3D scenes by the ray tracing picture generating unit 24 in changing the relative division number in accordance with FIG. 11.
Figure 21:
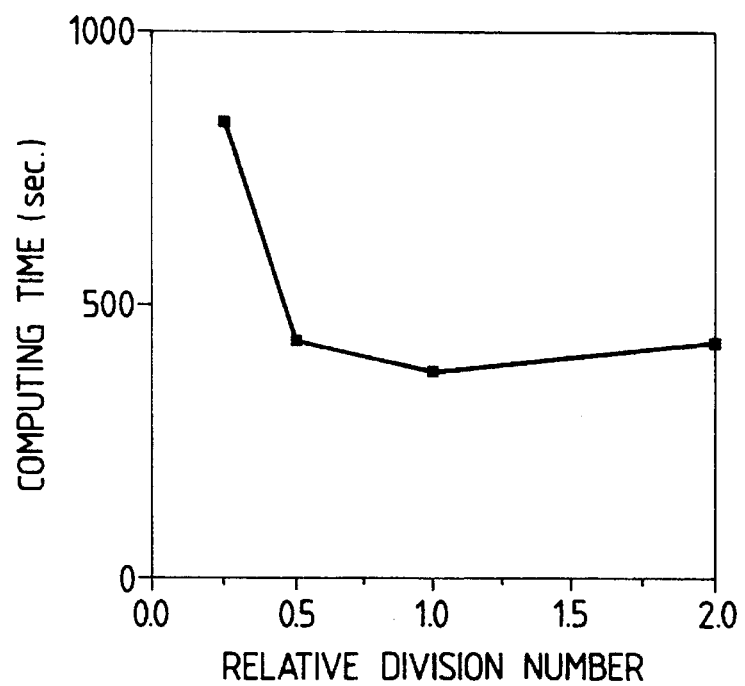
FIG. 21 shows the measured computing times for generating a picture for the second one of four different 3D scenes by the ray tracing picture generating unit 24 in changing the relative division number in accordance with FIG. 12.
Figure 22:
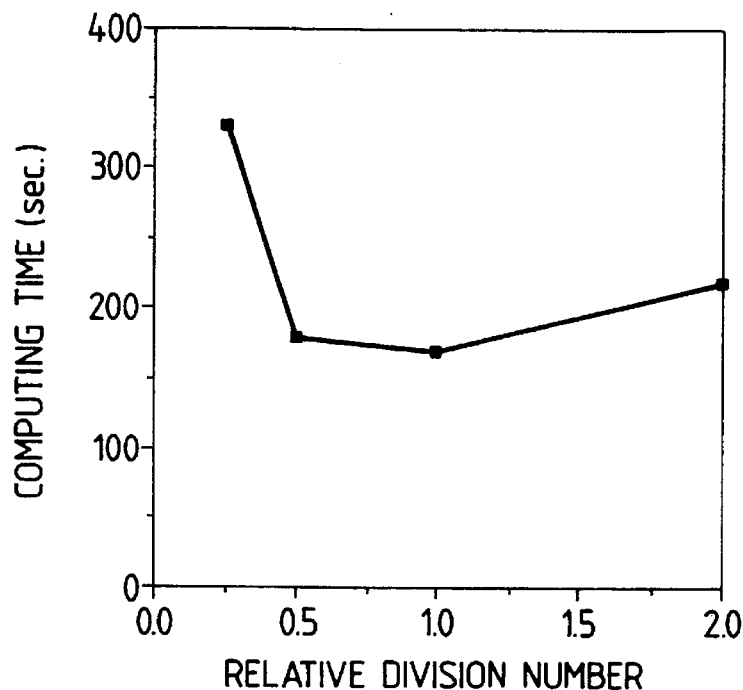
FIG. 22 hows the measured computing times for generating a picture for the third one of four different 3D scenes by the ray tracing picture generating unit 24 in changing the relative division number in accordance with FIG. 13.
Figure 23:
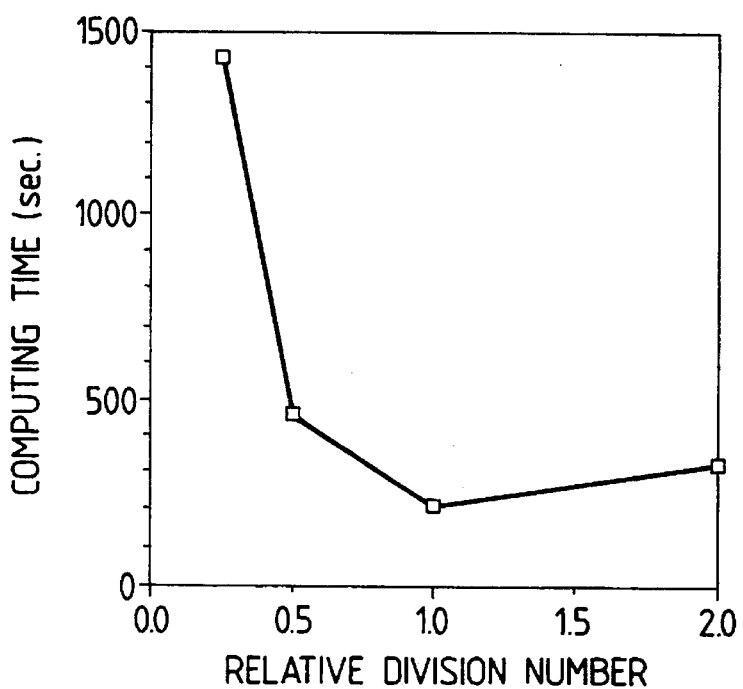
FIG. 23 shows the measured computing times for generating a picture for the fourth one of four different 3D scenes by the ray tracing picture generating unit 24 in changing the relative division number in accordance with FIG. 14.

(Whole size of space enclosing all objects)/(Object average size)

where the whole size of the space enclosing all objects is the whole size obtained by the boundary of the space enclosing all objects. The process for calculating the average object size 2232 can be carried out for each coordinate of x, y and z. In such processing, three average quantities of objects are calculated from the summation of the rectangular parallelepiped boundaries enclosing an individual object for all objects, that is, the three average widths in the x, y and z directions of all objects-are obtained. FIG. 18 shows a flow of a process 2231 executed in the calculating part of the space enclosing all objects. The process 2234 initializes all coordinate data of the space boundary to a zero value. The process 2235 executes a process 2236 for all objects. The process 2236 enlarges the space boundary by comparing the boundary coordinates of the objects and the present space boundary coordinates. FIG. 19 shows a flow of a process 2232 for calculating an average size of all objects. A process 2237 initialize the value of the average size of all objects as zero. A process 2238 executes a process 2239 for all objects. The process 2239 obtains the size of an object from its boundary and adds the size to the summation of the object sizes. A process 2240 calculates the average size of all objects. FIGS. 20–23 show the measured computing times for the same cases as described in FIGS. 11–14 using the ray tracing picture generating unit 24 and the present figures are expressed by the relative division number on the lateral axis. Then, the relative division number is the relative quantity of the division number in setting the division number obtained by using the average size of the objects as 1.0. As shown in FIGS. 20–23, the optimal relative division number for each case takes the value of 0.5–1.0. From the above-mentioned investigations, it can be said that the division number deciding method based on the average size of the objects is effectual.

In another embodiment, the voxel subdivision number is determined on the basis of the division number allocated to each object. This division number deciding method sets the division number of the object as the voxel subdivision number in each dimension. The above-mentioned division number allocated to each object is the division number obtained by triangle division. The division method is applied to the shape of an object to which the intersection point calculation can not be directly carried out. For example, the intersection calculation can not be generally directly executed to such a fractal shape as a parametric surface, a mountain, the sea surface etc. For such shapes, a triangle division is performed and the intersection calculation is executed. Such a division process is needed because the voxel subdivision number directly obtained by the object average size is prone to be under-estimated. Therefore, the division number should be determined on the basis of the divided shape of the object, since the intersection point calculation is executed for the divided triangle shape. If the 3D scene space contains a plurality of objects, the average value of the division number allocated to each object is used to the voxel subdivision number of the object in each dimension. By the above-described division method, the voxel subdivision number for intersection point searching is decided.

Figure 24:
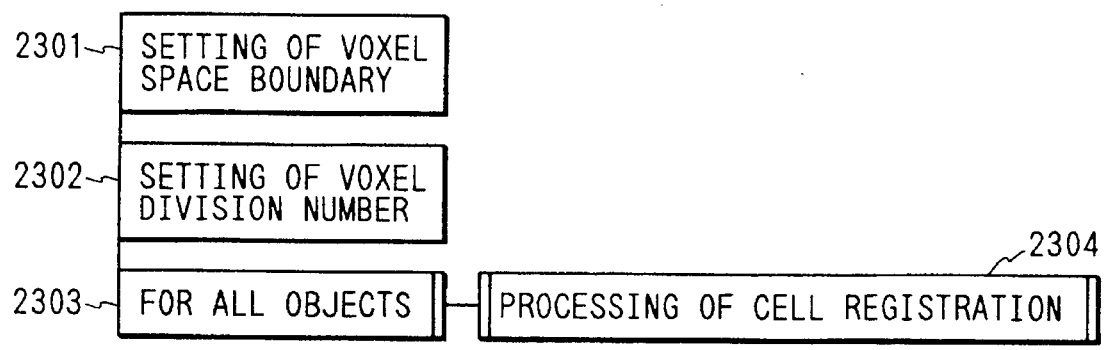
FIG. 24 is a flow chart of a process executed in the voxel registering unit 23.
Figure 25:
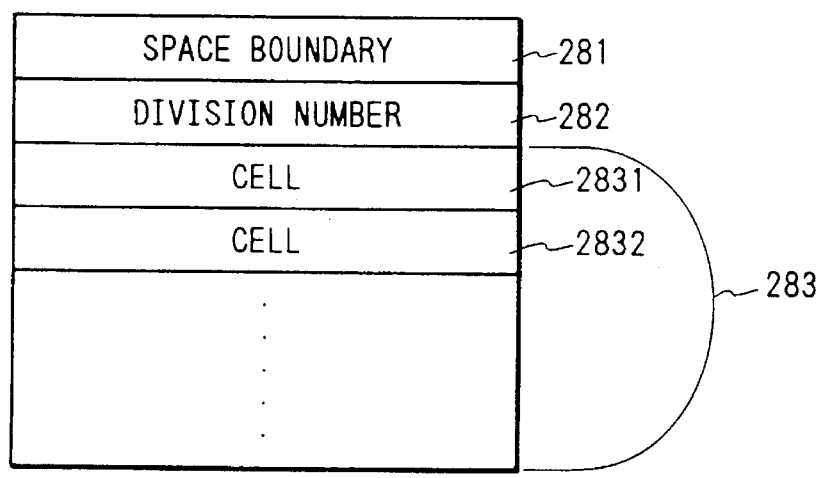
FIG. 25 shows an example of the contents of a data table in the voxel table 28.
Figure 26:
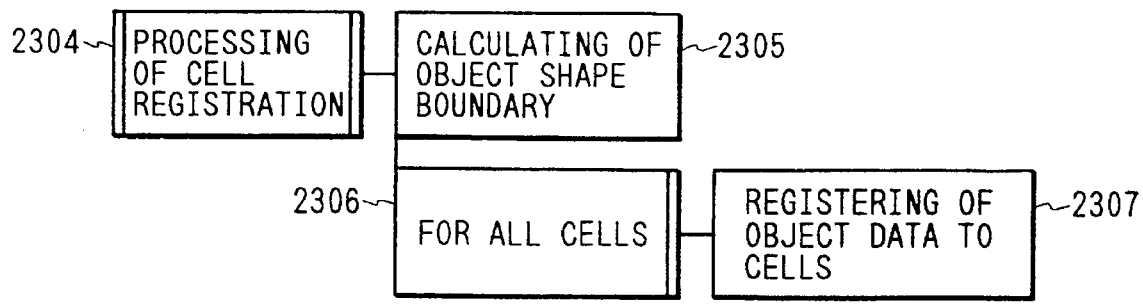
FIG. 26 is a flow chart of processing of cell registration 2304.
Figure 27:
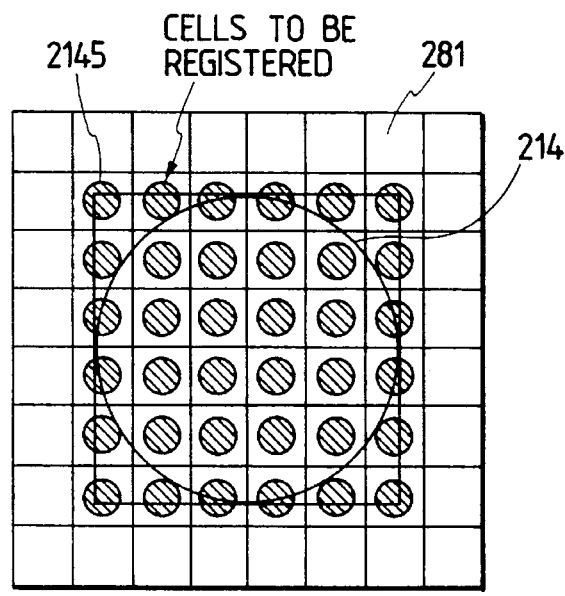
FIG. 27 is a conceptual drawing for explaining a process for calculating an object shape boundary 2305.
Figure 28:
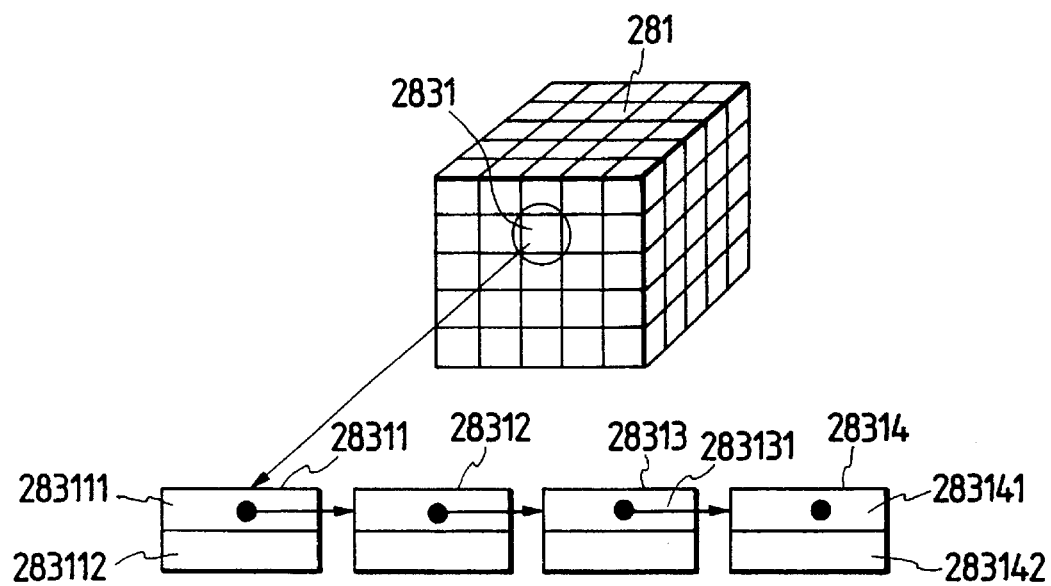
FIG. 28 is a conceptual drawing for explaining a process for registering object data in cells 2307.
Figure 29:
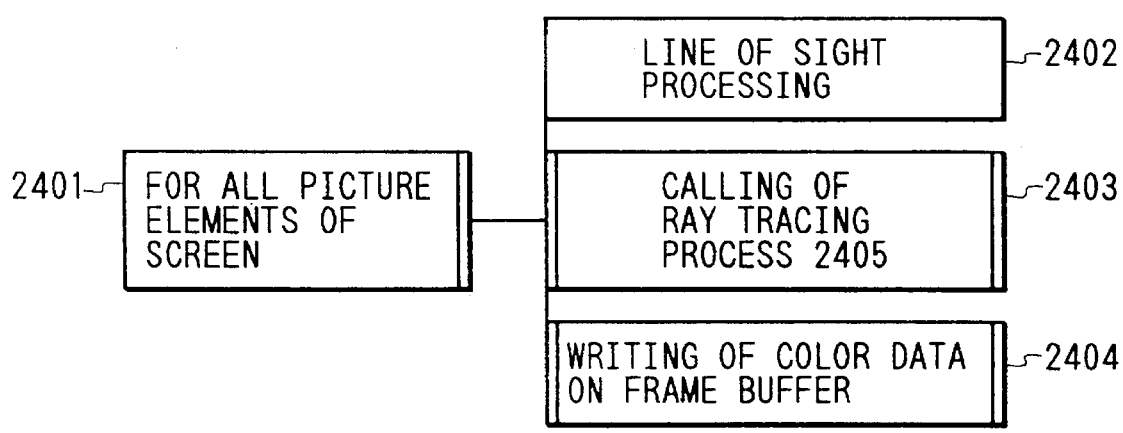
FIG. 29 is a main flow chart of a process executed in the ray tracing picture generating unit 24.
Figure 33:
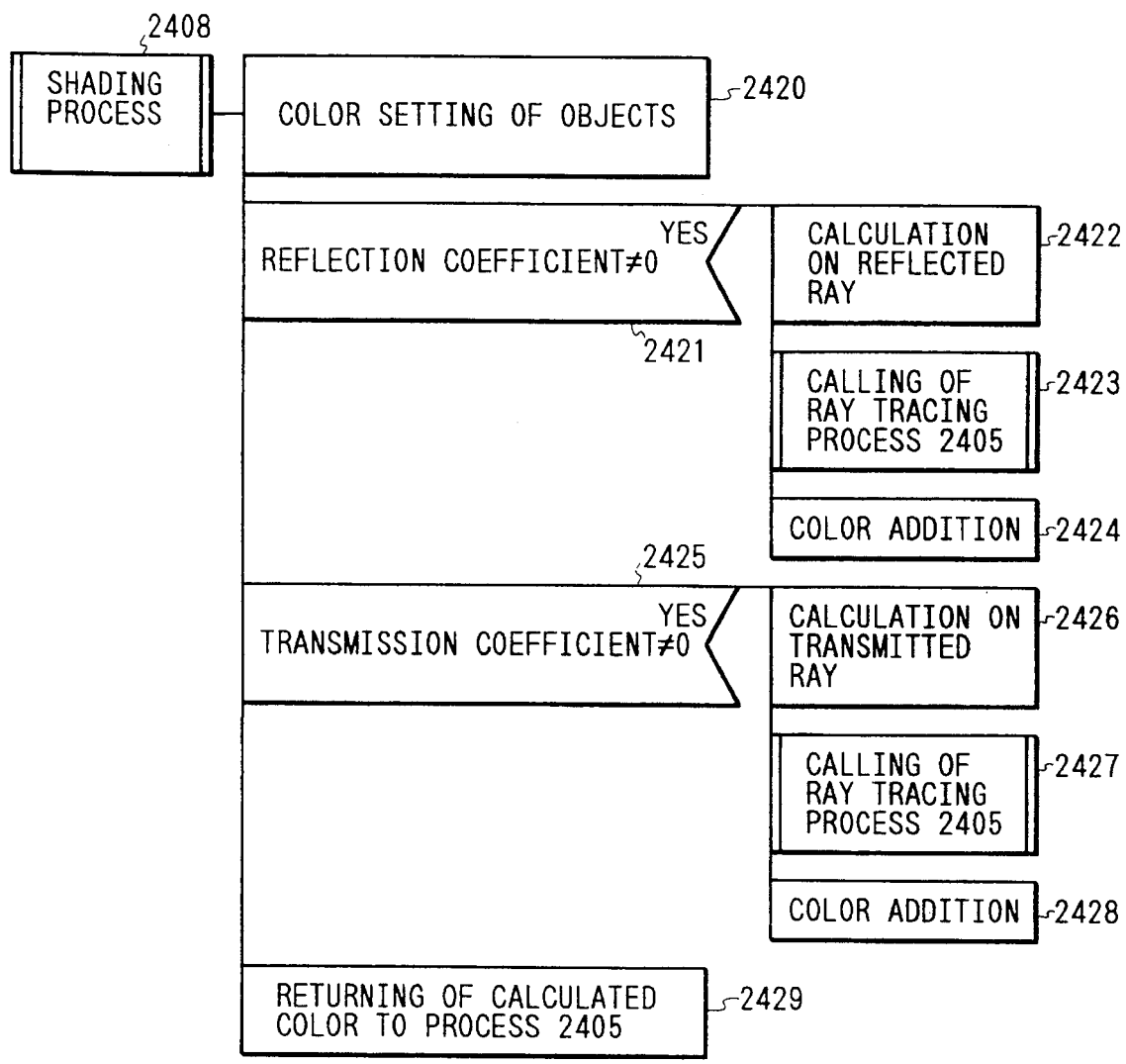
FIG. 33 is a flow chart of a shading process 2408.

In the following, details of the voxel registering unit 23 for establishing the voxel table 28 and the ray tracing picture generating unit 24 using the voxel table 28 will be described. FIG. 24 shows a process flow executed in the voxel registering unit 23. FIG. 25 is a drawing showing the contents of the voxel table 28. A process 2301 for setting of a voxel space boundary determines the space boundary 281 in the voxel table 28. The space boundary 281 is determined as the boundary voxels obtained by the division number deciding unit 22 enclosing all objects. A process 2302 for setting of the voxel subdivision number sets up the division number 282 of the voxel table 28 obtained by the division number deciding unit 22. And, the process 2302 provides a group of cells 283 of the division number 282. The cell holds the pointer to the list of the registered object. A process 2303 executes a process 2304 for registering each object in the 3D scene into the cells. FIG. 26 shows a flow of processing 2304 of cell registration. The process 2305 determines all cells to be registered from the shape boundary of each objects. As shown in FIG. 27, all cells to be registered are determined from the space boundary 281, the division number 282 and the shape boundary 2145 of an object 214 shown in FIG. 3. The cells to be registered are the cells indicated by oblique lines which are on the shape boundary 2145 of the object 214. A process 2306 executes a process 2307 for all cells. The process 2307 registers the cell data in the cells. FIG. 28 is a conceptual drawing for explaining the process 2307. As shown in the figure, the object registered in the cell 2831 is organized in the list. Each list stores the address of the next list and such object data as the data 211 shown in FIG. 3. And, a region 283111 stores the address of the next list and a region 283112 stores the object data. If another new object is registered in the cell 2831, the process 2307 establishes a new list 28314 and stores the data of the new object in a new region 283142. And, the process 2307 registers the address of the list 28314 in the region 283131 of the list 28313. FIGS. 29–33 show process flows executed in the ray tracing picture generating unit 24. FIG. 29 shows a main flow of the process executed in the ray tracing picture generating unit 24. A process 2401 invokes the processes described below for all picture elements on the screen 12. A process 2402 obtains the ray data to carry out the ray tracing. In the process 2402, the ray is represented by the line from the visual point of a camera through a picture element of the screen 12. A process 2403 sends the ray data to a ray tracing process 2405 and receives the color returned from the process 2405. A process 2404 writes the color received by the process 2403 on the frame buffer. FIG. 30 shows a flow of the ray tracing process 2405 described in FIG. 29. A process 2406 searches the intersection point nearest to the visual point by using the received ray data. A process 2407 judges whether the ray intersects an object as a result of process 2406. If an intersection point exists, then the process 2407 calculates the color of the object by using the optical attribute data of the object and the intersection point data obtained by the intersection point searching process 2406. Otherwise, a process 2409 is executed. The process 2409 returns the color of the background to the process 2403 which calls the process 2405. FIG. 31 shows a flow of the intersection point searching process 2406. A process 2410 obtains all cells that the ray penetrates by using the ray data and clears the intersection point data stacks. A process 2411 executes a process 2412 for all cells obtained by the process 2410. The process 2412 executes a process 2413 for all objects registered in the cell. The process 2413 executes the intersection calculation. A process 2415 stores the intersection point data returned from the process 2413 in the intersection point data stack. A process 2414 determines the intersection point nearest to the visual point from the points stored in the intersection point data stacks and returns the determined point to the process 2405. FIG. 32 shows a flow of the intersection calculation process 2413. A process 2417 assigns the intersection calculation process corresponding to the shape data type of the object: judging from the shape data type 2101 of the object table 210. A process 2418 executes an intersection calculation for the triangles with the ray and returns the intersection data to the process 2406. A process 2419 executes an intersection calculation for the spheres with the ray and returns the intersection data to the process 2406. FIG. 33 shows a flow of the shading process 2408. A process 2420 sets the color of the object, namely, the color registered in the optical attribute data 2103 of the data table 210. A process 2412 executes processes 2422, 2423 and 2424 if the reflection coefficient is not 0 after examining the reflection coefficient of the object registered in the optical attribute data 2103 of the data table 210. A process 2422 calculates the ray data toward the reflecting direction by using the intersection point data calculated by the intersection point searching process 2406 and the ray data. A process 2423 sends the reflecting direction ray data to the ray tracing process 2405 and receives the color returned from the ray tracing process 2405. A process 2424 executes the color addition processing of the color received by the process 2423. A process 2425 executes processes 2426, 2427 and 2428 if the transmission coefficient is not 0 after examining the transmission coefficient of the object registered in the optical attribute data 2103 of the data table 210. A process 2426 calculates the ray data extending in the transmitting direction by using the intersection data calculated by the intersection point searching process 2406 and the ray data. A process 2427 sends the ray data in the transmitting direction to the ray tracing process 2405 and receives the color returned from the ray tracing process 2405. A process 2428 executes the color addition processing of the color received by the process 2427. Finally, a process 2429 returns the color to the process 2405.

The picture generating apparatus and method using ray tracing of the present invention can speed up the ray tracing process since an improved voxel subdivision is used, as compared to the method using the octree subdivision. Computing time for the improved voxel subdivision method of the present invention is independent of the object space distribution since, by using the representative geometrical characteristic parameter of the objects, the improved voxel subdivision method divides the object space more uniformly to the cells as compared to the octree subdivision method. Furthermore, the division number can be automatically obtained since the geometrical characteristic parameter, such as the object average size, is calculated by the apparatus of the present invention. In the example applying the present invention to a piping design in buildings of a nuclear power plant, it is expected that about thirty minutes of generating time for one picture can be reduced to about one fourth (8 minutes).

What is claimed is:

1. A picture generating apparatus using ray tracing comprising:

three dimensional scene inputting means for inputting from a data base and storing data of objects including shape data, space distribution data and optical attribution data of said objects composing a virtual three dimensional space;

data registering means for storing in a voxel table data of said objects in individual voxels obtained by dividing said virtual three dimensional space including said objects into a plurality of voxels;

picture generating means for generating pictures by applying a ray tracing method to the data of said divided voxels in said voxel table and for displaying the generated pictures using a display device; and division number deciding means for determining the number of voxels into which said three dimensional space circumscribing said objects is to be equally divided on the basis of a representative size for a size distribution of all of said objects composing said virtual three dimensional space.

2. A picture generating apparatus using ray tracing comprising:

three dimensional scene inputting means for inputting from a data base and storing data of objects including shape data, space distribution data and optical attribution data of said objects composing a virtual three dimensional space;

data registering means for storing in a voxel table data of said objects in individual voxels obtained by dividing said virtual three dimensional space including said objects into a plurality of voxels;

picture generating means for generating pictures by applying a ray tracing method to the data of said divided voxels in said voxel table and for displaying the generated pictures using a display device; and division number deciding means for determining the number of voxels into which said three dimensional space is to be divided on the basis of a representative size of all of said objects composing said virtual three dimensional space, wherein said representative size is an average volume obtained by a summation of bounding volumes, each of which circumscribes at least a part of one of said objects, and a total number of said objects.

3. A picture generating apparatus using ray tracing according to claim 2, wherein a shape of said bounding volumes is one of a box and a sphere.

4. A picture generating apparatus using ray tracing comprising:

three dimensional scene inputting means for inputting from a data base and storing data of objects including shape data, space distribution data and optical attribution data of said objects composing a virtual three dimensional space;

data registering means for storing in a voxel table data of said objects in individual voxels obtained by dividing said virtual three dimensional space including said objects into a plurality of voxels;

picture generating means for generating pictures by applying a ray tracing method to the data of said divided voxels in said voxel table and for displaying the generated pictures using a display device; and division number deciding means for determining the number of voxels into which said three dimensional space is to be divided on the basis of a representative size of all of said objects composing said virtual three dimensional space, wherein said representative size is expressed by three average widths as to total bounding boxes, each of which circumscribes at least a part of one of said objects, in x, y and z coordinate directions.

5. A picture generating apparatus using ray tracing comprising:

three dimensional scene inputting means for inputting from a data base and storing data of objects including shape data, space distribution data and optical attribution data of said objects composing a virtual three dimensional space;

data registering means for storing in a voxel table data of said objects in individual voxels obtained by dividing said virtual three dimensional space including said objects into a plurality of voxels;

picture generating means for generating pictures by applying a ray tracing method to the data of said divided voxels in said voxel table and for displaying the generated pictures using a display device; and division number deciding means for determining the number of voxels into which said three dimensional space is to be divided on the basis of a representative size of all of said objects composing said virtual three dimensional space, wherein said division number deciding means comprises means for calculating a volume of said virtual three dimensional space bounding all of said objects, means for calculating said representative size and means for calculating said voxel division number.

6. A method of generating pictures by ray tracing comprising the steps of:

inputting from a data base and storing data of objects including shape data, space distribution data and optical attribution data of said objects composing a virtual three dimensional space;

registering in a voxel table data of said objects in individual voxels obtained by dividing said virtual three dimensional space including said objects into a plurality of voxels;

determining the number of voxels into which said three dimensional space circumscribing said objects is to be equally divided on the basis of a representative size for a size distribution of all of said objects composing said virtual three dimensional space;

generating pictures by applying a ray tracing method to the data of said divided voxels in said voxel table; and displaying said generated pictures.

7. A method of generating pictures by ray tracing comprising the steps of:

inputting from a data base and storing data of objects including shape data, space distribution data and optical attribution data of said objects composing a virtual three dimensional space;

registering in a voxel table data of said objects in individual voxels obtained by dividing said virtual three dimensional space including said objects into a plurality of voxels;

determining the number of voxels into which said three dimensional space is to be divided on the basis of a representative size of all of said objects composing said virtual three dimensional space;

generating pictures by applying a ray tracing method to the data of said divided voxels in said voxel table; and displaying said generated pictures, wherein said step of determining said voxel division number comprises the steps of calculating a volume of said virtual three dimensional space bounding all of said objects, calculating said representative size and calculating said voxel division number.

8. A method of generating pictures by ray tracing according to claim 7, wherein, in said step of calculating said representative size, said representative size is calculated for an average volume obtained by a summation of bounding volumes, each of which circumscribes at least a part of one of said objects, and a total number of said objects.

9. A method for generating pictures by ray tracing according to claim 7, wherein, in said step of calculating said representative size, said representative size is calculated for three average widths as to total bounding boxes, each of which circumscribes at least a part of one of said objects, in x, y and z coordinates.

* * * * *